UNITED STATES PATENT OFFICE.

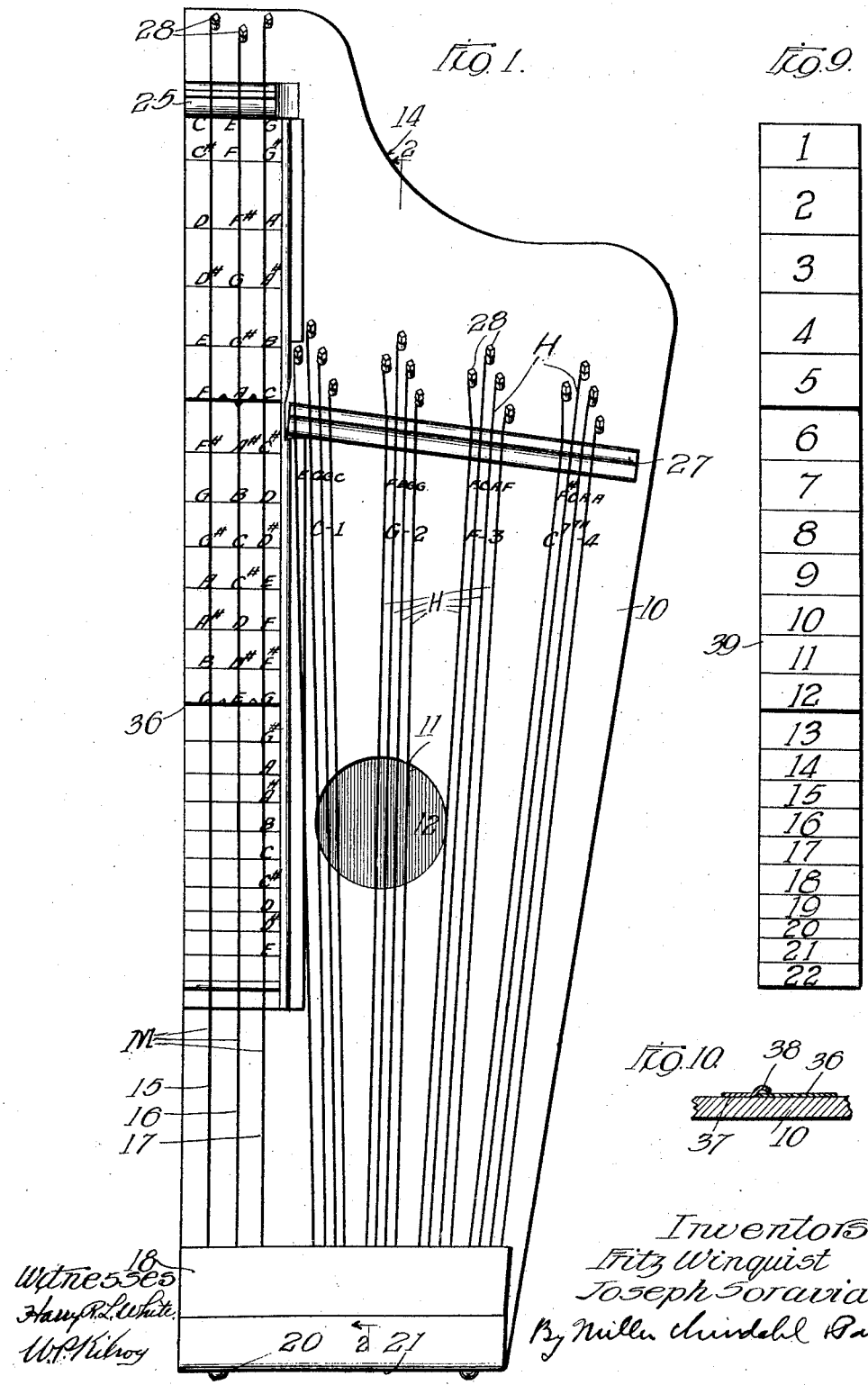

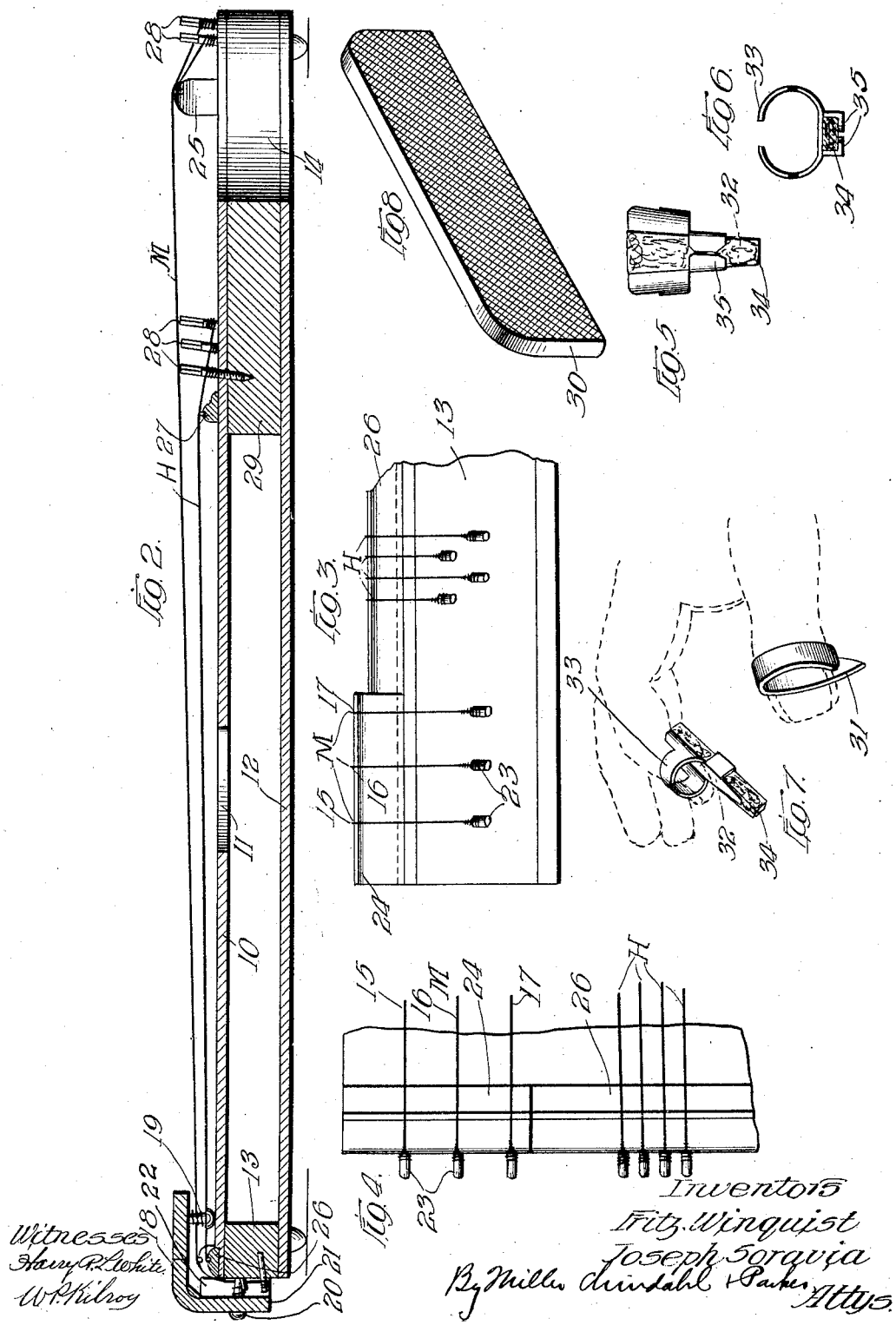

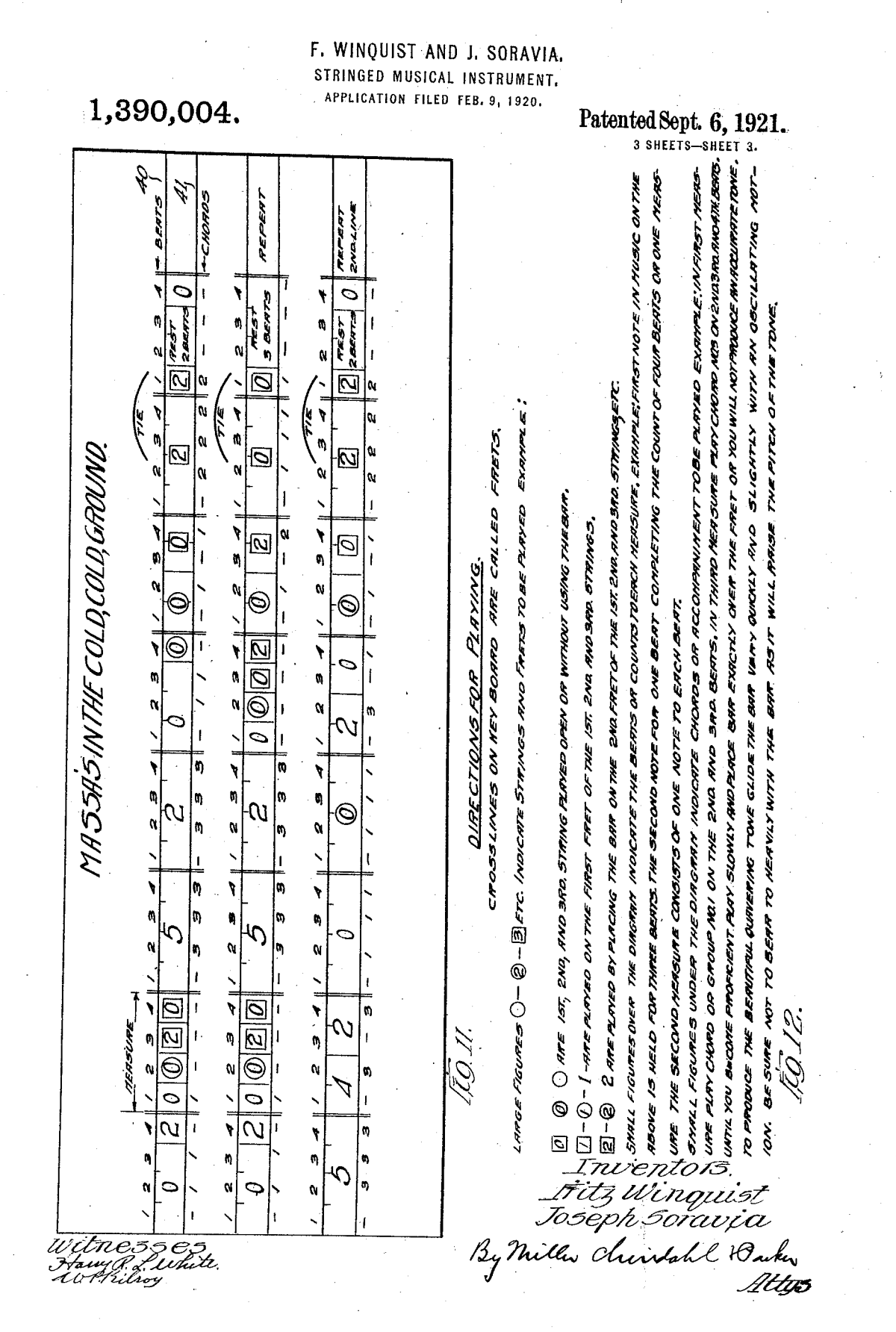

FRITZ WINQUIST, OF CHICAGO, AND JOSEPH SORAVIA, OF OAK PARK, ILLINOIS.

STRINGED MUSICAL INSTRUMENT.

1,390,004.  Specification of Letters Patent.  Patented Sept. 6, 1921.

Application filed February 9, 1920. Serial No. 357,462.

*To all whom it may concern:*

Be it known that we, FRITZ WINQUIST and JOSEPH SORAVIA, citizens of the United States, residing at Chicago, in the county of Cook and State of Illinois, and Oak Park, in the county of Cook and State of Illinois, respectively, have invented certain new and useful Improvements in Stringed Musical Instruments, of which the following is a specification.

Our invention relates to improvements in musical instruments and more particularly to the class of stringed instruments similar to the zither and guitar. The general objects of the invention are to combine in a single instrument the music-producing capabilities of the Hawaiian steel guitar and the zither.

The unique and plaintive music of the Hawaiian steel guitar has recently become very popular and is in great demand. To produce this music on an ordinary guitar or those specially designed for it requires, however, an expert performer, and even when such an instrument is played by a competent performer the limitations of the accompaniment he is able to produce are such that the music is nearly always provided by two or more performers, one of whom provides an accompaniment upon another guitar, a ukulele, or some other suitable instrument.

The zither is relatively little used by English speaking peoples and is not capable of being played with a steel bar to produce Hawaiian music. We have succeeded in producing an instrument which may, when well built, be made to possess tone qualities comparable in excellence with a good zither or Hawaiian guitar and on which a melody may be played with a steel bar and pick making the instrument the full equivalent of the Hawaiian steel guitar, and the same performer may simultaneously produce on the same instrument a suitable accompaniment. Our improved instrument may be played by relatively unskilled performers and produce highly satisfactory music; in the hands of a highly skilled performer it may, moreover, be used very effectively to provide a surprisingly wide range of musical effects.

Further objects of our invention are to provide a replaceable chart for the instrument and to provide a special system of chart indicia and a special system of musical notation for enabling persons to perform successfully upon the instrument without learning the relatively complicated system of notation employed in writing ordinary music. While the general principles of the system may be applied to other musical instruments than the one herein disclosed, in this specific embodiment the system is particularly applicable to our instrument.

Referring to the accompanying drawings, Figure 1 is a plan view and Fig. 2 is a vertical section on the line 2—2 of Fig. 1 of an illustrative embodiment of our invention. Fig. 3 is an elevation of the narrow end of the instrument, and Fig. 4 is a plan view of a portion of that end of the instrument illustrating the manner of attaching and supporting the ends of the strings. Figs. 5 and 6 are detail views of an improved finger pick which we prefer to use in playing the instrument, and Fig. 7 illustrates a finger pick on the first finger of the hand of a performer and also a thumb pick of ordinary design. Fig. 8 shows a steel bar similar to those used in playing the ordinary Hawaiian steel guitar. Fig. 9 is a plan view of a substitute chart to be placed on the instrument when playing it according to our improved and simplified system of notation. Fig. 10 is a detail section illustrating the clip for holding the detachable charts in place. Fig. 11 is a copy of a sample sheet of music constructed according to our invention indicating the proper method of playing a musical selection, the selection illustrated being "Massa's in the cold, cold ground." Fig. 12 is a copy of some of the directions for playing the instrument.

In the embodiment of our invention selected for illustration the body or resonating element of the instrument is a hollow box comprising a top piece 10 having a sound hole 11 and an imperforate bottom piece 12, the top and bottom pieces being suitably united around the edges of the instrument by edge walls or spacing blocks 13 and 14. These parts and their shape and arrangement may be widely varied to secure various desirable tone qualities.

Mounted on the lefthand side of the instrument as shown in Fig. 1 is a set of strings M upon which the melody is to be played. Three strings 15, 16 and 17 have been illustrated. To the right in a spaced series extending across the body, are a plurality of sets of chord strings H which may be tuned to provide appropriate chords for the accompaniment. As illustrated, these groups of strings diverge slightly, being farthest apart at the broader end of the instrument, and relatively close together at the other end.

A suitable hand rest and cover for the narrow end of the instrument is provided comprising an annular body portion 18 held spaced from the top of the box by suitable projections 19 illustrated as screws having their heads resting on the box, and fastened in place by screws 20 passing through the guard portion 21 and entering the spacing block 13. Suitable blocks 22 at the ends of the guard 21 hold it spaced from the spacing block 13 to allow clearance for the pins 23 to which the melody strings M and the chord strings H are suitably attached.

As illustrated in Fig. 2 the melody strings M are spaced farther from the top 10 of the box than the chord strings H and are also considerably longer, being carried at their lower ends by a high bridge 24 and at their upper end by a separate high bridge 25. Low bridges 26 and 27 serve to aline and support the tone producing portions of the chord strings. The chord and melody strings, after passing over their respective bridges are attached at their outer ends to pins 28 rotatably mounted in the customary manner, and adapted to be adjusted by a suitable tool engaging their squared upper ends to properly tension the strings for tuning purposes. Reinforcing blocks such as 29 are preferably employed to provide attachment means of sufficient strength for the pins 28. The blocks 29 may be made integral with the edge wall 14 if so desired.

The tools we prefer to employ to assist the operator in playing on our improved instrument comprise the usual steel bar 30, illustrated in Fig. 8, the usual thumb pick 31, illustrated in Fig. 7, and a pick and holder to be used in picking the chord strings with the first finger. This pick and holder are illustrated in Figs. 5, 6 and 7 and comprise a metal body 32 having arcuate wings 33 to engage the finger of the operator. The body 32 is a box-like structure adapted to receive the pick proper 34 which is preferably a piece of hard felt, although any suitable material may be employed. Where, for instance, a jangling effect is desired, a piece of wood may be substituted. Ears 35 formed integral with the body portion of the holder, embrace and hold the pick proper 34 which, as illustrated, is cut with a slight taper so that it may be wedged in place and firmly held.

In playing our improved instrument it is laid flat on a table or other suitable support and the operator stands or sits at the narrow end or foot of the instrument where his right hand, wrist, or forearm, may rest on the hand rest 18; in which position the melody strings M may be conveniently plucked with the thumb, and the chord strings H may be stroked with the first finger.

The steel bar 30 is held in the left hand, the left arm being extended out over the instrument to position the bar over the melody strings and control the pitch of the note produced.

The tuning we prefer to employ for the melody strings has been illustrated in Fig. 1 by the indicia carried by the ordinary chart 36. As illustrated, the left hand string is tuned to middle C, or using the common system of notation, $C_3$. The second string is tuned to $E_3$ and the third to $G_3$. While we have illustrated a specific tuning and sheets of special music arranged to be used with the tuning preferred, it will be obvious that the intervals between the strings may be varied and that different tunings may be employed. The tuning we have illustrated, however, gives the three open melody strings M the intervals of a tonic chord and in producing a piece of music all three strings may be simultaneously plucked either when open to produce this chord or when properly held by the steel bar to produce another chord in the same or any other key. This ability to produce concordant tones simultaneously on more than one melody string, in addition to playing the melody, is a particularly advantageous feature of the tuning illustrated.

The sets of chord strings, of which we have illustrated four sets each composed of four strings, may be tuned to produce a variety of suitable chords. Using the nomenclature ut, re, mi, fa, sol, la, ti, ut, we prefer to tune the chord strings adjacent the melody strings to the tonic chord which may be built up of any desired combination of the tones ut, mi and sol, preferably with ut or sol as the lowest or fundamental note. Similarly, the second set of chord strings is to be tuned to sound the dominant chord which in its pure form is made up entirely of the tones sol, ti and re. We prefer, however, to include the seventh therein, adding the tone fa, which materially improves the effect of the chord. The third set of chord strings we prefer tuned to produce the subdominant chord made up of the tones fa, la and ut.

The fourth set of chord strings, and additional sets, if such are provided, may preferably be tuned to produce one or more additional chords for modulation purposes and to increase the harmony, richness and variety of the accompaniment. Such chords may obviously include the mediant, submediant and other chords. The dominant chords of keys having one or two less flats or more sharps than the key of the tonic chord, may be found particularly useful and advantageous.

We have discussed the tuning we prefer in order to give persons skilled in the art a satisfactory idea of the capabilities and use of the instrument. It will be obvious, however, that the tuning employed may be varied at the will of the performer.

For the purpose of facilitating the use of our instrument either by accomplished musicians accustomed to read music written according to the usual system of notation, or by relatively unskilled performers who do not readily read music thus written, we provide means for removably mounting a chart corresponding to a fingerboard under the melody strings of the instrument so that charts of various kinds may be provided. This mounting may comprise, as illustrated in Fig. 10, a simple cleat 37 having a turned-up edge 38 providing a groove in which the chart may be readily inserted. The shape of the groove or the resilience of the cleat may be readily so designed that friction will hold the chart in place. These charts correspond to finger-boards, although, of course, in using the steel bar, the strings are merely held at points above the lines drawn on the chart, without pressing the strings against the body of the instrument. In addition to the lines, which correspond to frets, other indicia indicating notes according to any desired system of notation, may be carried by the chart.

In Fig. 9 we have illustrated a chart 39 bearing instead of the letters and sharps shown on the chart in Fig. 1 a simple series of consecutive numbers, numbering the positions corresponding to frets from 1 up. In this chart a single character serves for all the strings. The use of such a chart does not require a knowledge of musical notation on the part of the performer. In Fig. 11 we have illustrated a sample sheet of music written for use in connection with the chart of Fig. 9. The indicia carried by the sheet illustrated comprise a central row of large characters, each character indicating the number of the line over which the bar is to be held. The string to be picked to produce the appropriate note is indicated in connection with each central character or note number as follows: Notes to be played on the right-hand or third string are indicated by simple note numbers; notes to be played on the center or second string are indicated by the note number inclosed in a circle; and notes to be played on the left-hand or first string are indicated by note numbers inclosed in a square. Upper and lower lines 40 and 41 suitably spaced to accommodate the note numbers, extend across the page, and perform in part the function of the ordinary staff.

Time is perhaps one of the greatest difficulties encountered by unskilled performers and this difficulty is materially increased by the practice of printing music so as to indicate the time merely by the character of the note employed without regard to the space on the paper allotted to the note. In music printed according to our improved system, the staff is divided from left to right into equal spaces, each space corresponding to a certain time interval, so that the distance on the paper between a certain note and the notes adjoining it on either side affords a quantitative means of estimating the time to be allotted to that note. The piece illustrated happens to be written with four beats to the measure and the beats of each measure are indicated by small numbers 1, 2, 3 and 4, just above the row of larger numbers indicating the position of the bar and the strings to be picked. Suitable means for indicating the measures as an entirety comprises a double line ruled vertically across the paper at the end of each measure. After a little practice in the use of music written according to our improved system, it will be obvious that the numbers 1, 2, 3 and 4 over each measure may be omitted if desired; the time intervals being indicated by single lines drawn downward for a very short distance from the upper line 40 between beats, and by a single line drawn from the upper line 40 to the lower line 41 to separate the beats where different notes are played on different beats.

The accompaniment is indicated by suitable indicia corresponding to each beat and located just below the lower line 41. The sets of chords are preferably numbered 1, 2, 3 and 4, etc., chord 1 being the chord next the melody strings, or the tonic, chord 2 being the dominant chord and chord 3 the subdominant, etc. Thus it will be seen that in the second measure of the piece illustrated, the tonic chord and the open right-hand string are both sounded on the first beat of the measure; on the second beat the open middle string without any chord, and on the third and fourth beats the left-hand string held over the second line and the open left-hand string are played, also without chords. Rests are preferably to be indicated by writing out the word "Rest" at least in the charts used for preliminary practice, and as the system of writing the music affords suitable space therefor, this practice may profitably be followed in all the music. Repeats are preferably also indicated by writing them out, although other means of indicating them may be employed.

A plurality of instruction sheets for beginners, or a small instruction book is provided with each instrument; the nature of the instructions being indicated in a general way by Fig. 12, which, in connection with Fig. 11 might serve as the first lesson or exercise in such a book.

It will be seen that we have provided a single instrument capable of meeting the requirements outlined above. While we have described and illustrated in detail a preferred embodiment of our invention and have pointed out particularly the tuning we prefer to employ for the purpose of explaining to persons skilled in musical arts, the capabilities of the instrument, it should be clearly understood that the description is only for purposes of illustration and that many modifications and variations will naturally occur to those skilled in the art. The melody strings, for instance, might be carried at their upper ends by a neck with frets, so that they could be fingered, as in a banjo or mandolin. We aim in the subjoined claims to cover all such legitimate variations and modifications.

We claim as our invention:

1. A musical instrument comprising a tapering body, and a plurality of spaced sets of chord strings tension across said body, said sets of strings diverging toward the large end of the body.

2. A musical instrument played by plucking the strings having, in combination, a resonant body, a plurality of sets of strings lying in the same plane and adjacent said body throughout their length, and an additional set of strings tensioned over said body and lying in a different plane, said additional set of strings being laterally offset so as not to overlie any of the other sets of strings.

3. A musical instrument played by plucking the strings having, in combination, a plurality of sets of strings located in different planes whereby the strings of one set may be controlled by a straight bar to vary their pitch for playing a melody without disturbing the other strings.

4. A musical instrument having, in combination, a body, a plurality of sets of closely spaced chord strings, said sets being closely spaced at one end of the instrument and diverging toward the other end.

5. A musical instrument played by plucking the strings having, in combination, a body, a set of adjacent strings tuned to produce a chord and all lying in the same plane relatively close to said body and an additional string tensioned over said body, said additional string being removed from said body far enough for satisfactory control of its pitch by a steel bar held in the hand of the operator.

6. A musical instrument having, in combination, a string arranged to be played with a steel bar for determining the pitch, a set of adjacent strings tuned to produce a chord, and a single resonant body supporting all said strings, and underlying said chord strings throughout their length.

7. A musical instrument played by plucking the strings having, in combination, a string arranged to be played with a steel bar for determining the pitch, sets of chord producing strings any set of which may be sounded practically simultaneously by a single movement, and a single resonant body supporting all said strings.

8. A musical instrument played by plucking the strings having, in combination, strings arranged to be played upon with a steel bar to determine the pitch, and additional sets of strings, each set adapted to be sounded by a single movement simultaneously with said first-mentioned strings, and a single resonant body supporting all said strings.

9. A musical instrument played by plucking the strings having, in combination, a plurality of sets of strings, an additional set of strings arranged to be played with a steel bar to determine the pitch, and a single resonant body supporting all said strings.

10. A musical instrument played by plucking the strings having, in combination, a body, a plurality of sets of strings positioned relatively close to said body and an additional set of strings positioned farther from said body and arranged to be played with a steel bar to determine the pitch, all said strings overlying said body and arranged to be played from the same side of the body.

11. A musical instrument having, in combination, a body, a set of strings spaced so as to be played with a steel bar to determine the pitch, and additional sets of strings carried by the same instrument for producing a suitable accompaniment by sounding the several sets selectively with a single stroke.

12. A musical instrument having, in combination, a body having a narrow end, a plurality of sets of parallel chord strings extending from said narrow end across the body of the instrument, said sets diverging to increase the space between them where they are to be engaged in playing.

In testimony whereof we have hereunto set our hands.

FRITZ WINQUIST.
JOSEPH SORAVIA.